UNITED STATES PATENT OFFICE.

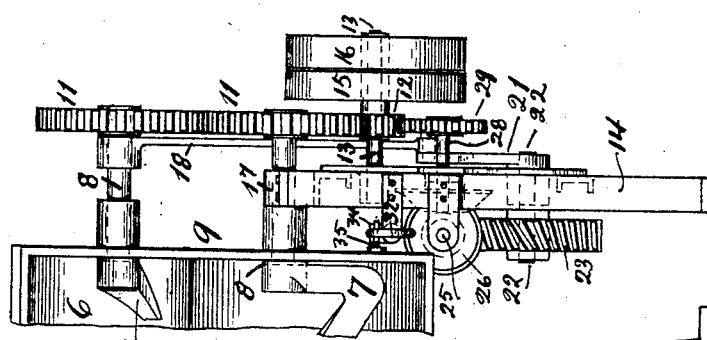
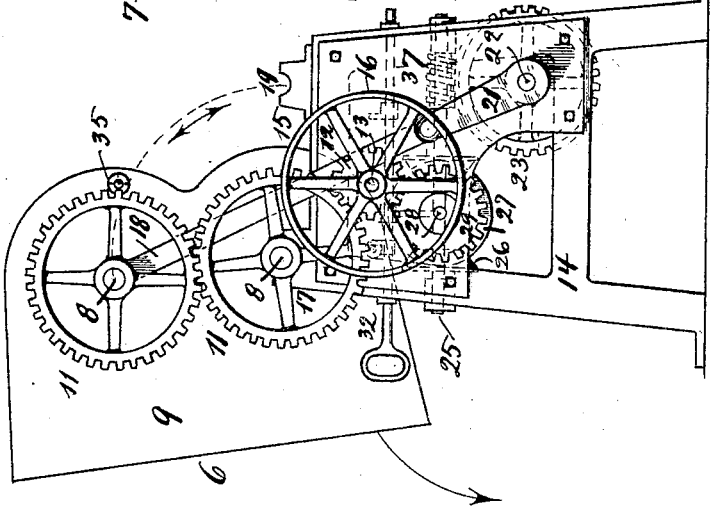
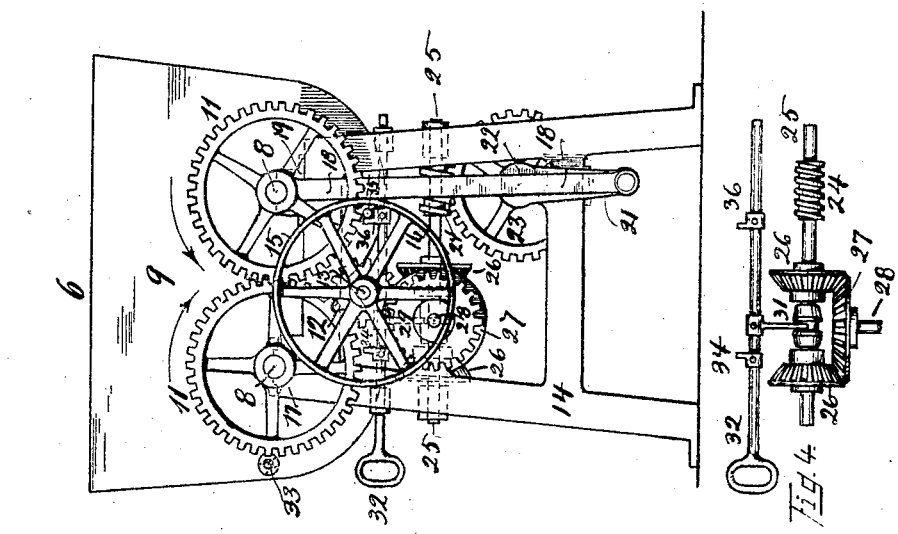

HENRY C. CHAMBERS, OF CINCINNATI, OHIO, ASSIGNOR TO SUPERIOR TOOL & SUPPLY CO., OF CINCINNATI, OHIO, A FIRM.

MIXING-MACHINE.

No. 803,555.  Specification of Letters Patent.  Patented Nov. 7, 1905.

Application filed April 24, 1905. Serial No. 257,080.

*To all whom it may concern:*

Be it known that I, HENRY C. CHAMBERS, a citizen of the United States, residing at Cincinnati, Hamilton county, State of Ohio, have invented certain new and useful Improvements in Mixing-Machines; and I do declare the following to be a clear, full, and exact description thereof, attention being called to the accompanying drawings, with the reference characters marked thereon, which form also a part of this specification.

This invention relates to improvements in mixers, meaning thereby a class of mechanical devices whereby certain materials, usually in reduced form, like small pieces, granules, powder, &c., are mixed or worked into a plastic condition by means of an added liquid, which is generally water.

Mixers for meat, dough, and similar materials are here in view; and my invention is described in connection with a device for mixing dough. Such machines consist of a receptacle or trough which receives the material to be mixed, of agitating devices by which the material is worked, and of means to actuate these agitating devices. The mass after mixing is removed from the trough in various ways, as in some cases by the opening of a discharge-outlet and in others by the tilting of the trough, whereby its contents are dumped, the trough in the latter case being accordingly supported to permit such tilting. This operation may be accomplished manually or by mechanical means.

My invention relates to that species of mixers in which the trough is dumped mechanically; and the invention consists in the main of certain means and mechanism whereby the trough is tilted to discharge its contents and of the construction and arrangement whereby the trough is supported in a manner to permit it to be so manipulated. Certain improvements relating to the general construction are also shown.

In the following specification, and particularly pointed out in the claims at the end thereof, is found a full description of my invention, together with its operation, parts, and construction, which latter is also illustrated in the accompanying drawings, in which—

Figure 1 is a side elevation of a mixer provided with the improvements contemplated by my invention, operating parts being in normal position. Fig. 2 in a similar view shows the trough in position for dumping its contents. Fig. 3 is part of a front view of the mixer with parts in position as they appear in the preceding figure. Fig. 4 in a detail view shows the manipulating devices detached.

In the drawings, 6 indicates the trough which receives the matter to be worked or mixed. Devices 7 to agitate this matter are provided in it, which devices are arranged and constructed to suit the particular purpose of the mixer and condition of matter to be worked. These devices are usually mounted on shafts 8, which are supported in the sides 9 9 of the trough and extend beyond this latter to receive the means whereby they are actuated. This actuation is mostly by rotation, accomplished usually by cog-wheels 11, one mounted on the end of each of the agitator-shafts, as shown. They may each be driven from a pinion; but I arrange it, as shown, where a pinion 12 drives one of these wheels and which latter drives the other wheel. This enables me, the pinion rotating accordingly, to cause the agitating devices to rotate in opposite direction and upwardly from the bottom of the trough at the edges of the same, whereby all danger to the operator's hands by being drawn in at such edges is avoided.

Pinion 12 is mounted on a stud-shaft 13, which projects from the side of one of the machine end frames 14, and is driven from a suitable source of power by means of a pulley 15, also mounted on stud-shaft 13, a loose pulley 16 being mounted alongside of it. For discharge of its contents the trough is tilted, as shown in Fig. 2, for which purpose it is pivotally supported on trunnions between the end frames of the machine, one frame 14 being shown in Fig. 3, another one of similar shape being provided on the other end of the machine. The pivotal support is preferably near the front edge of the trough—that is, near that edge of it which during tilting is lowered. The effect of this location of the pivot is to prevent this edge from coming down too low during tilting, and thus leaves space sufficient for placing a suitable receptacle under such edge to receive the contents of the dumping-trough. Since agitator-shafts 8 are available in this case to serve as trunnion-journals, I use one of them accordingly so and extend for such purpose the front shaft sufficiently and support its ends in boxes 17, provided on end frames 14 of the machine.

To swing the trough on these trunnion-pivots, I provide a lifter-rod 18, which takes hold of the trough at one of its sides and at a point back of its pivots. As a means for so attaching this lifter-rod at one of its ends the extended end of the rear agitator-shaft 8 may be conveniently used, part of such extended shaft serving also as additional means to support the trough in its normal position. It is fitted for such purpose to rest in a bearing 19, which is also provided on end frame 14 and is in form of an open box, so that the shaft may freely move in and out, as is best understood by comparing Figs. 1 and 2.

Since one lifter-rod at one side of the trough is sufficient in most cases, this agitator-shaft at its opposite end would not have to extend beyond its bearing in the side of the trough to receive the end of such a lifter-rod. It may extend, however, sufficiently to serve in conjunction with a similar open box 19 on the other frame as an additional support for the trough when at rest. For actuation this lifter-rod is connected to a crank-arm 21, mounted on a shaft 22 to be rotated thereby, said shaft being supported in a suitable bearing provided on the machine-frame. The length of this arm is so arranged that extreme positions of its free end at points diametrically apart within the circular path of its rotation move lifter-rod sufficiently to tilt the trough to a desired angle from the position shown in Fig. 1 to the one shown in Fig. 2 and also return it again to the first position. For its rotation shaft 22 is operatively connected to the driving mechanism of the machine in any suitable manner, a preferable way being by means of a worm-wheel 23, mounted at one end of shaft 22 and rotated by a worm 24, mounted on a shaft 25. This worm-shaft is rotated by bevel-wheels 26 mounted on it and operated by a bevel-wheel 27, mounted on a shaft 28, which is rotated by a cog-wheel 29, driven from main driving-shaft 13. It may for such purpose be in mesh with pinion 12 on said shaft. The two bevel-wheels 26 are loosely mounted on the worm-shaft and one only transmits motion to this latter at the time, the particular bevel-wheel being for such purpose operatively connected to the worm-shaft by a sliding clutch 31 of customary construction, which clutch is manipulated by a handle-rod 32 in the usual manner. By means of this clutch and its handle-rod the tilting motion of the trough may also be stopped at any time, so that this latter may also be held in an intermediate position—that is, one more or less inclined to lower one of its edges to facilitate charging of the trough. One bevel-wheel 26 would be sufficient for operating the worm-shaft to obtain merely the tilting movement of the trough. I have provided, however, also means to stop the motion of the trough automatically at the end of either one of the movements, which brings it into either one of its extreme positions. This is done by stops which project from the side of the trough and engage lugs on the handle-rod to shift this latter automatically. Thus, for instance, when starting the tilting operation handle-rod 32 would be pulled outwardly, so that clutch 31 engages and drives the left one of bevel-wheels 26 as they appear in Fig. 1. After that the operator would not have to stand by and watch the machine, because a stop 33 will in due time encounter a lug 34 on the handle-rod, as shown in Fig. 2, and both being properly located of course with reference to each other the clutch is shifted out of mesh with the particular bevel-wheel and moved to an intermediate inactive position, thus stopping the motion of the trough automatically and leaving this latter in its tilted position, as shown in Fig. 2. To return it, the operator pushes handle-rod in opposite direction—that is, inwardly—so that the clutch engages the other bevel-wheel—the one on the right side—whereupon the trough moves back again toward its normal position, the movement continuing until another stop 35 engages a lug 36, as shown in Fig. 1, thereby shifting the clutch again and stopping automatically the operation of the tilting mechanism. The bearings for the various parts, rods, and stud-shafts of the mechanism may be conveniently provided on the machine-frame.

In Figs. 2 and 3 I have shown the bearings for the stud-shafts as provided on a mounting-plate 37, which in turn is attached to the machine-frame. The fitting, assembling, and mounting of the operating mechanism is thereby facilitated. This tilting mechanism is also applicable in cases where only one set of agitating devices and one agitator-shaft is used, since the trunnion-journals and the point of connection of the lifter-rod to the side of the trough do not necessarily have to be constituted by the projecting ends of agitator-shafts. By arranging the position of operating-arm 21 accordingly the tilting movement of the trough may also be obtained by pulling the same down instead of lifting it up.

The design and arrangement of the machine is such that the agitating devices may be kept going even in the dumping position of the trough, thus facilitating evacuation of this latter, the particular direction of rotation favoring this act.

Having described my invention, I claim as new—

1. In a mixing-machine, the combination of a trough, trunnion-journals on opposite sides thereof, supports for them, a lifter-rod attached with one of its ends to one of the sides of the trough and means to actuate this rod in a manner to raise or lower the trough on its journals.

2. In a mixing-machine, the combination of a trough provided with agitating devices, trunnion-journals on opposite sides thereof, frames on which they are supported, a lifter-rod attached with one of its ends to the side of the trough, a crank-arm supported on the machine-frame and connected with its free end to the other end of the lifter-rod and means to rotate this crank-arm in a manner to cause the lifter-rod to raise or lower the trough on its journals.

3. In a mixing-machine, the combination of a trough provided with agitating devices, trunnion-journals on opposite sides thereof, frames on which they are supported, a lifter-rod attached with one end to the side of the trough, a crank-arm, a shaft on which it is supported, a worm-wheel mounted on this shaft, a worm to rotate the same and means to actuate the worm.

4. In a mixing-machine, the combination of a trough provided with agitating devices, trunnion-journals on opposite sides thereof, frames on which they are supported a lifter-rod attached to one of the sides of the trough, mechanism operating to actuate this rod to swing the trough on its journals, means to start the operation of this mechanism, a slidable handle-rod to manipulate these means supports for it, in which it moves and complementary projections on this rod and on the trough whereby the motion of this latter is automatically stopped.

5. In a mixing-machine, the combination of a trough, two sets of agitating devices, shafts on which they are carried and the ends of which shafts are mounted in opposite sides of the trough, means to rotate these shafts, trunnion-journals projecting from opposite sides of the trough, a machine-frame on which they are supported, a tilting rod attached with one of its ends to one end of one of the agitator-shafts which for such purpose is extended beyond the trough and mechanism to actuate this tilting rod.

6. In a mixing-machine, the combination of a trough, two sets of agitating devices, shafts on which they are carried and the ends of which shafts are mounted in opposite sides of the trough, through and beyond which they project, means to rotate these shafts, the extended end of one of them forming trunnion-journals, a machine-frame on which they are supported, a tilting rod attached with one of its ends to the extended end of the other agitator-shaft and means to actuate this tilting rod.

7. In a mixing-machine, the combination of a trough, agitating devices carried therein, engaging gear-wheels to operate them, trunnion-journals on opposite sides of the trough, a machine-frame on which they are supported, tilting mechanism to swing the trough on these journals, a driving-shaft 28 for this tilting mechanism a gear-wheel 29 mounted on it, a pinion simultaneously in mesh with this gear-wheel and with one of the gear-wheels of the agitating devices, thus simultaneously operating these latter and shaft 28 an intermediate clutch device whereby the operation of the driving-shaft for the tilting device may be interrupted and started at will and means to manipulate this clutch device.

In testimony whereof I hereunto affix my signature in the presence of two witnesses.

HENRY C. CHAMBERS.

Witnesses:
　C. Spengel,
　C. Meyer.